(12) United States Patent
Yang et al.

(10) Patent No.: US 7,143,185 B1
(45) Date of Patent: Nov. 28, 2006

(54) METHOD AND APPARATUS FOR ACCESSING EXTERNAL MEMORIES

(75) Inventors: Feng-Jong Edward Yang, San Jose, CA (US); Bahadir Erimli, Campbell, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1183 days.

(21) Appl. No.: 09/650,195

(22) Filed: Aug. 29, 2000

(51) Int. Cl.
*G06F 15/16* (2006.01)
*G06F 15/173* (2006.01)
*G06F 15/167* (2006.01)
*G06F 12/00* (2006.01)

(52) U.S. Cl. .................. 709/245; 709/238; 709/213; 711/5; 711/157

(58) Field of Classification Search ............ 709/213, 709/214, 216, 238, 245; 711/149, 147, 150, 711/5, 157; 370/389, 392, 400
See application file for complete search history.

(56) References Cited

U.S. PATENT DOCUMENTS

| | | | |
|---|---|---|---|
| 4,247,920 A * | 1/1981 | Springer et al. ....... | 365/230.04 |
| 4,384,342 A * | 5/1983 | Imura et al. ................ | 711/5 |
| 4,652,993 A * | 3/1987 | Scheuneman et al. ...... | 711/151 |
| 4,930,066 A * | 5/1990 | Yokota ........................ | 711/149 |
| 4,933,846 A * | 6/1990 | Humphrey et al. ......... | 710/107 |
| 5,136,582 A * | 8/1992 | Firoozmand ................ | 370/400 |
| 5,237,670 A * | 8/1993 | Wakerly ..................... | 710/100 |
| 5,515,376 A * | 5/1996 | Murthy et al. .............. | 370/402 |
| 5,680,401 A * | 10/1997 | Gayton et al. .............. | 370/474 |
| 5,696,913 A * | 12/1997 | Gove et al. ................. | 710/317 |
| 5,740,402 A * | 4/1998 | Bratt et al. ................. | 711/157 |
| 5,875,470 A * | 2/1999 | Dreibelbis et al. .......... | 711/147 |
| 5,887,148 A * | 3/1999 | Lentz et al. ................ | 710/307 |
| 6,021,477 A * | 2/2000 | Mann ........................ | 711/167 |
| 6,052,751 A * | 4/2000 | Runaldue et al. .......... | 710/107 |
| 6,208,650 B1* | 3/2001 | Hassell et al. ............. | 370/392 |
| 6,460,120 B1* | 10/2002 | Bass et al. ................. | 711/148 |
| 6,483,844 B1* | 11/2002 | Erimli ....................... | 370/428 |
| 6,587,913 B1* | 7/2003 | Campanale et al. .......... | 711/5 |
| 6,633,576 B1* | 10/2003 | Melaragni et al. ............ | 711/5 |

* cited by examiner

*Primary Examiner*—Saleh Najjar
*Assistant Examiner*—Kevin T Bates
(74) *Attorney, Agent, or Firm*—Harrity Snyder, L.L.P.

(57) ABSTRACT

A network switch that controls the communication of data frames between stations includes receive devices that correspond to ports on the network switch. The receive devices receive and store data frame information from the network stations. The network switch also includes an external memory interface that receives the data frame information from the receive devices and transfers the data frame information to multiple external memory devices.

19 Claims, 5 Drawing Sheets

METHOD AND APPARATUS FOR ACCESSING EXTERNAL MEMORIES

TECHNICAL FIELD

The present invention relates generally to network communications and, more particularly, to accessing external memories via a network switch.

BACKGROUND ART

In computer networks, a number of network stations are typically interconnected via a communications medium. For example, Ethernet 802.3 is a commonly used local area network (LAN) scheme in which multiple stations are connected to a shared serial data path. These stations often communicate with a switch located between the data path and the stations connected to that path. The switch typically controls the communication of data and includes logic for receiving and forwarding data frames to their appropriate destinations.

When all of the stations connected to the network are simultaneously operating, data traffic on the shared serial path can be heavy with little time between data frames. Accordingly, some switches transfer the data frames to an external memory for storage to reduce on-chip memory requirements. The data frames must then be transferred back to the switch before transmitting the frames to their respective destinations. With increased network throughput requirements, such a processing arrangement often results in an unacceptable delay in forwarding the data frames.

One conventional way of reducing the time for processing data frames is to increase the width of the external memory bus. For example, as the number of ports supported by the switch increases, the data width of the external memory bus typically increases so that the data transfer rate is able to keep up with both the inbound and outbound packet rates.

As the width of the external memory bus increases, however, the bus efficiency decreases due to transfers involving the last few bytes of a data frame. For example, assume that the external memory bus is 16 bytes wide and the switch receives a data frame 65 bytes in length. In this case, five separate transfers are required to store all of the data to the external memory. On the last transfer, however, only one byte of meaningful data is transferred with the other 15 bytes being wasted. Accordingly, the bus efficiency for such a frame is 65/(5×16) or 81.25%. If all the ports receive similar packets, the switch resources will be used up transferring meaningless data and the data throughput of the switch will be significantly reduced.

Another drawback with increasing the width of the external memory bus involves memory management overhead. Each data frame stored to external memory typically includes a buffer header used for memory management. The buffer header may include information such as the address of the next buffer storing a portion of the data frame, the last buffer bit, etc. This buffer header information is usually a few bytes in length. When updating the buffer header or when accessing the header information for retrieving the stored data frame, only the few header bytes are transferred over the external memory bus with the remaining bytes being zero filled or filled with other meaningless data. This further decreases the bus efficiency and wastes valuable bandwidth.

DISCLOSURE OF THE INVENTION

There exists a need for a system and a method for increasing the efficiency associated with transferring data to and from an external memory while maintaining high data throughput.

These and other needs are met by the present invention, where a multiport switch includes an external memory interface that simultaneously transfers data frame information to two external memories to increase the bus efficiency and meet network bandwidth requirements.

According to one aspect of the present invention, a network switch controls communication of data frames between stations. The switch includes a plurality of receive devices corresponding to ports on the network switch. The receive devices are configured to receive data frames from the stations. The switch also includes an external memory interface configured to receive data from the plurality of receive devices, transfer a portion of the data received from a first one of the receive devices to a first memory, and transfer a portion of the data received from a second one of the receive devices to a second memory.

Another aspect of the present invention provides a method for storing data frame information received by a network switch that controls the communication of data frames. The method includes receiving a plurality of data frames and temporarily storing the received data frames. The method also includes simultaneously transferring data frame information to at least a first memory and a second memory.

Other advantages and features of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation represent like elements throughout.

BEST MODE FOR CARRYING OUT THE INVENTION

The present invention will be described with the example of a switch in a packet switched network, such as an Ethernet network. It will become apparent, however, that the present invention is also applicable to other packet switched systems, as described in detail below, as well as to other types of systems in general.

Figure 1:
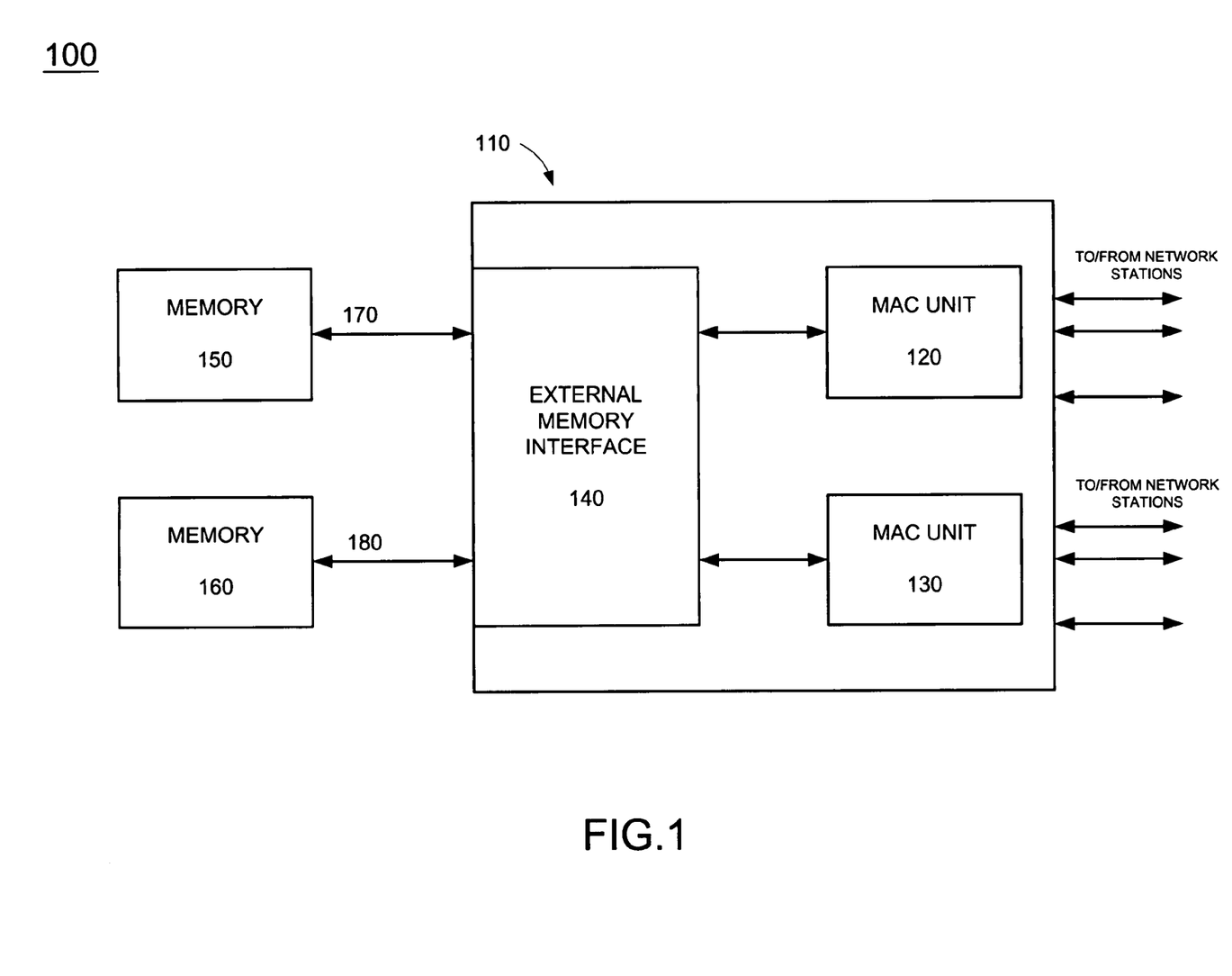
FIG. 1 is a block diagram of an exemplary system in which an embodiment of the present invention may be employed.

FIG. 1 is a block diagram of an exemplary system in which an embodiment of the present invention may be advantageously employed. The exemplary system 100 includes a network switch 110 and memories 150 and 160. The system 100 may also include a packet switched network, such as an Ethernet network. The network may include a number of network stations (not shown) having different configurations. According to an exemplary implementation, the network may include twenty-four 100 megabit per second (Mb/s) stations that send and receive data packets at a rate up to 100 Mb/s and two 1000 Mb/s, (i.e., 1 gigabit per second, (Gb/s)) stations that send and receive data packets at a rate up to 1 Gb/s. Other network configurations may be used in alternative implementations of the present invention.

The switch 110 forwards data packets received from the network stations to the appropriate destinations based upon Ethernet protocol. The switch 110 may include media access control (MAC) units 120 and 130 and an external memory interface 140. The MAC units 120 and 130 may include MAC modules for each port supported by the switch. Each MAC module may include a MAC receive portion, a receive first-in first-out (FIFO) buffer, a transmit FIFO buffer and a MAC transmit portion. Data packets from the network stations are received by a corresponding MAC module and stored in the corresponding receive FIFO.

According to an exemplary implementation, MAC units 120 and 130 each include 12 MAC modules that support communications with twelve 100 Mb/s network stations and one MAC module that supports communication with one 1 Gb/s network station. In alternative implementations, the MAC units 120 and 130 may be combined into a single MAC unit or into other numbers of MAC units.

The external memory interface 140 enables external storage of data packets in external memories 150 and 160 via buses 170 and 180, respectively. In an exemplary implementation of the present invention, the external memories 150 and 160 may be synchronous static random access memory (SSRAM) devices. In alternative implementations, the external memories 150 and 160 may be other types of memory devices. As described previously, switch 110 controls the communication of data packets between network stations. Accordingly, the switch 110 includes various logic devices, such as switching subsystems, decision making logic and address tables, for receiving and forwarding the data packets to their respective destinations. Details of these logic devices are well known and are not shown or described in order not to unduly obscure the thrust of the present invention. The operation and structure of such devices, however, would be obvious to one of ordinary skill in this art.

Figure 2:
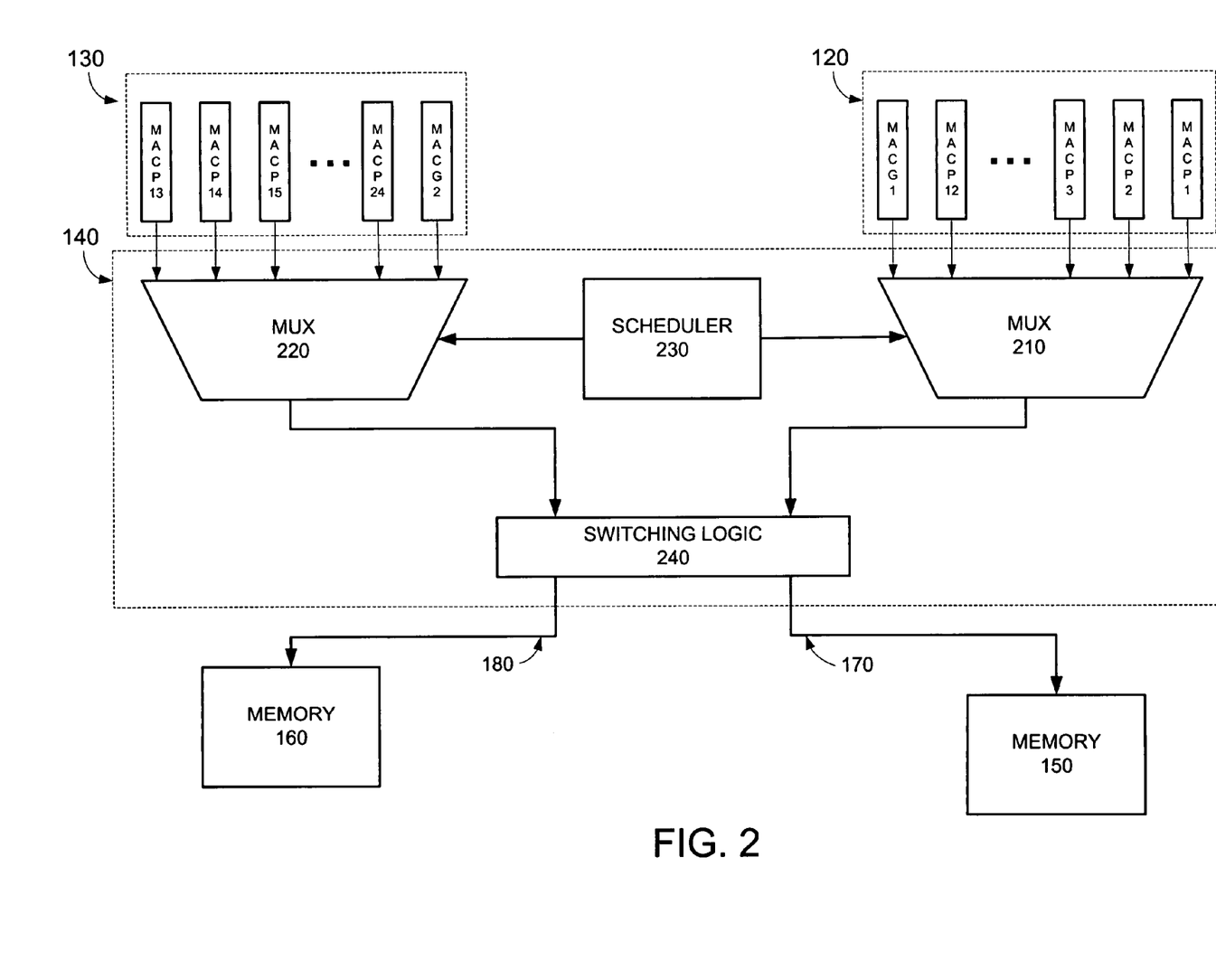
FIG. 2 is a detailed diagram illustrating an exemplary implementation of the network switch of FIG. 1.

FIG. 2 is a detailed block diagram of the network switch 110 of FIG. 1 according to an exemplary implementation of the present invention. MAC unit 120 includes MAC modules MACP1–MACP12 corresponding to twelve 100 Mb/s ports on the switch 110 and MACG1 corresponding to a 1 Gb/s port on the switch 110. MAC unit 130 similarly includes twelve MAC modules MACP13–MACP24 corresponding to 100 Mb/s ports and MAC module MPG2 corresponding to a 1 Gb/s port.

External memory interface 140 may include multiplexers 210 and 220, scheduler 230 and switching logic 240. Multiplexer 210 receives data inputs from MAC modules MACP1–MACP12 and MACG1 and multiplexer 220 receives data inputs from MACP13–MACP24 and MACG2. The multiplexers 210 and 220 selectively output the data frame information from the MAC modules to switching logic 240 in accordance with signals from scheduler 230, as described in more detail below.

Scheduler 230 transmits selection signals to multiplexers 210 and 220 for selectively outputting data frame information from the MAC units 120 and 130. The multiplexers 210 and 220 receive the selection signals and then output the corresponding data frame information to switching logic 240. Switching logic 240 transfers the received data frame information to memories 150 and 160 and ensures that data from the multiplexers 210 and 220 does not get transferred to the same memory simultaneously, thereby avoiding bus contention problems. In alternative implementations, the functions performed by switching logic 240 may be performed by scheduler 230. That is, the scheduling and switching functions may be performed by a single device located in external memory interface 140.

Figure 3:
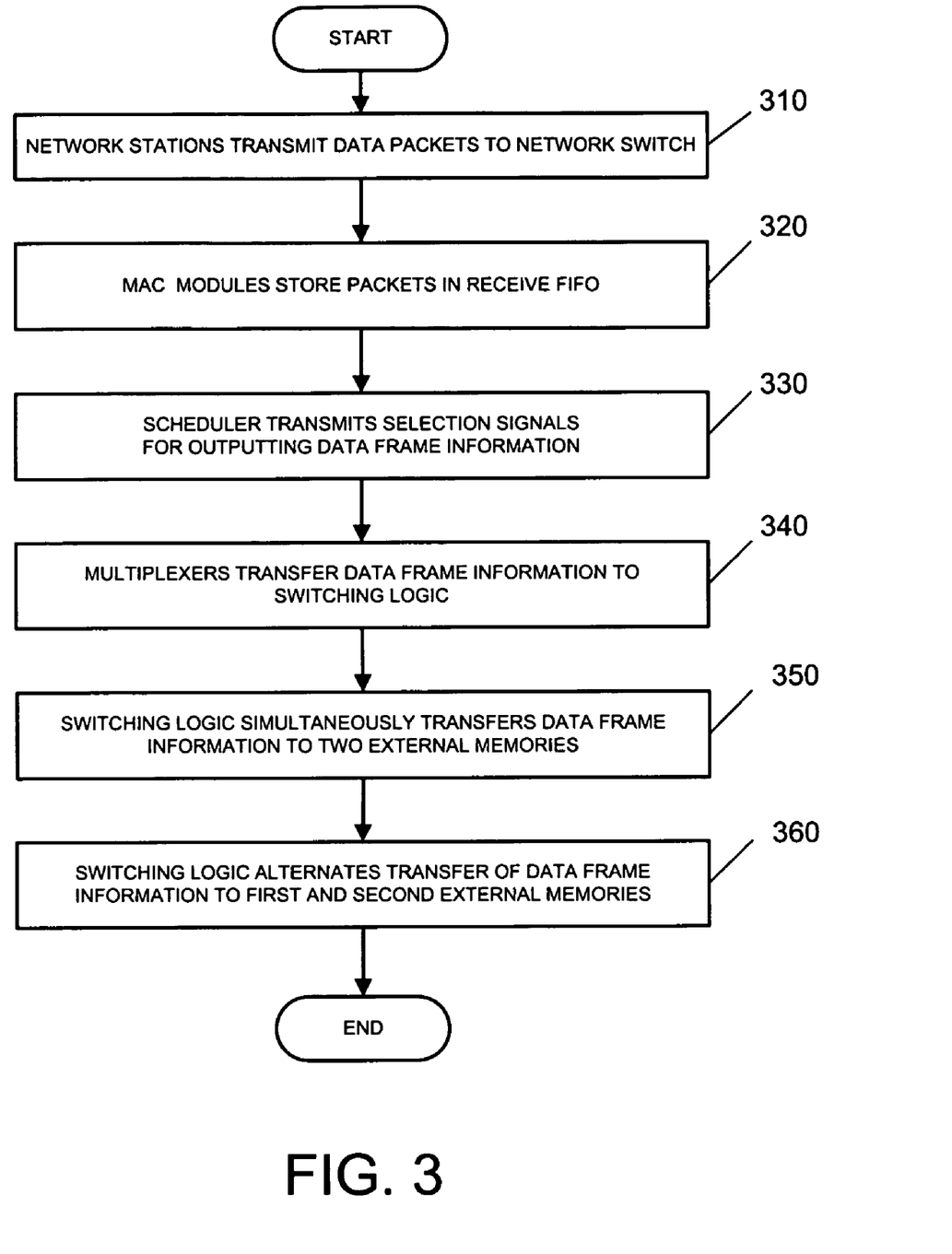
FIG. 3 is a flow diagram illustrating processing performed by the network switch of FIG. 1 according to an exemplary implementation of the present invention.

FIG. 3 illustrates exemplary processing for storing data packets in memories 150 and 160, according to an exemplary implementation of the present invention. Processing begins upon start-up of switch 110. Assume that each of the network stations transmits data packets to the switch 110 (step 310). The MAC units 120 and 130 receive the data packets and the respective MAC modules store the data packets in their receive FIFO buffer (step 320).

The scheduler 230 controls the transfer of data from the MAC receive FIFOs to the external memories 150 and 160. In an exemplary embodiment of the present invention, scheduler 230 may allocate a fixed amount of bandwidth to each port. For example, the scheduler 230 may allocate a time "slot" to each port supported by the switch 110. The fixed time slots together form an arbitration cycle. Each time slot in the arbitration cycle may be equivalent to one clock cycle in duration (a "1-clock slot") and each 1-clock slot may be allocated to a single port based on the predetermined priority.

In an exemplary implementation of the present invention, each MAC module transfers 64-bits (8 bytes) of data frame information to switching logic 240 during its 1-clock slot. The gigabit ports may have ten times as many slots as the 100 Mb/s ports since the Gb/s ports receive data packets at ten times the data rate of the 100 Mb/s ports. Other slots may also be reserved for other devices accessing the external memories 150 and 160 based on the particular network requirements.

In any event, the scheduler 230 simultaneously transmits selection or enable signals to multiplexers 210 and 220 to permit the multiplexers to output data from one of the corresponding MAC modules to switching logic 240, based on the predefined arbitration cycle (step 330). The multiplexers 210 and 220 receive the selection signals and transfer the data frame information from the corresponding MAC module to switching logic 240 (step 340). In alternative implementations, the scheduler 230 may receive signals from the MAC modules requesting access to the external memories 150 and 160 and grant priority based on the received request signals.

The switching logic 240 may simultaneously receive data from both multiplexers 210 and 220. The switching logic 240 may then simultaneously transfer the data frame information to memories 150 and 160 via data buses 170 and 180, respectively (step 350). According to an exemplary embodiment, each transfer is an individual transfer with an independent address associated with each transfer.

Figure 4:
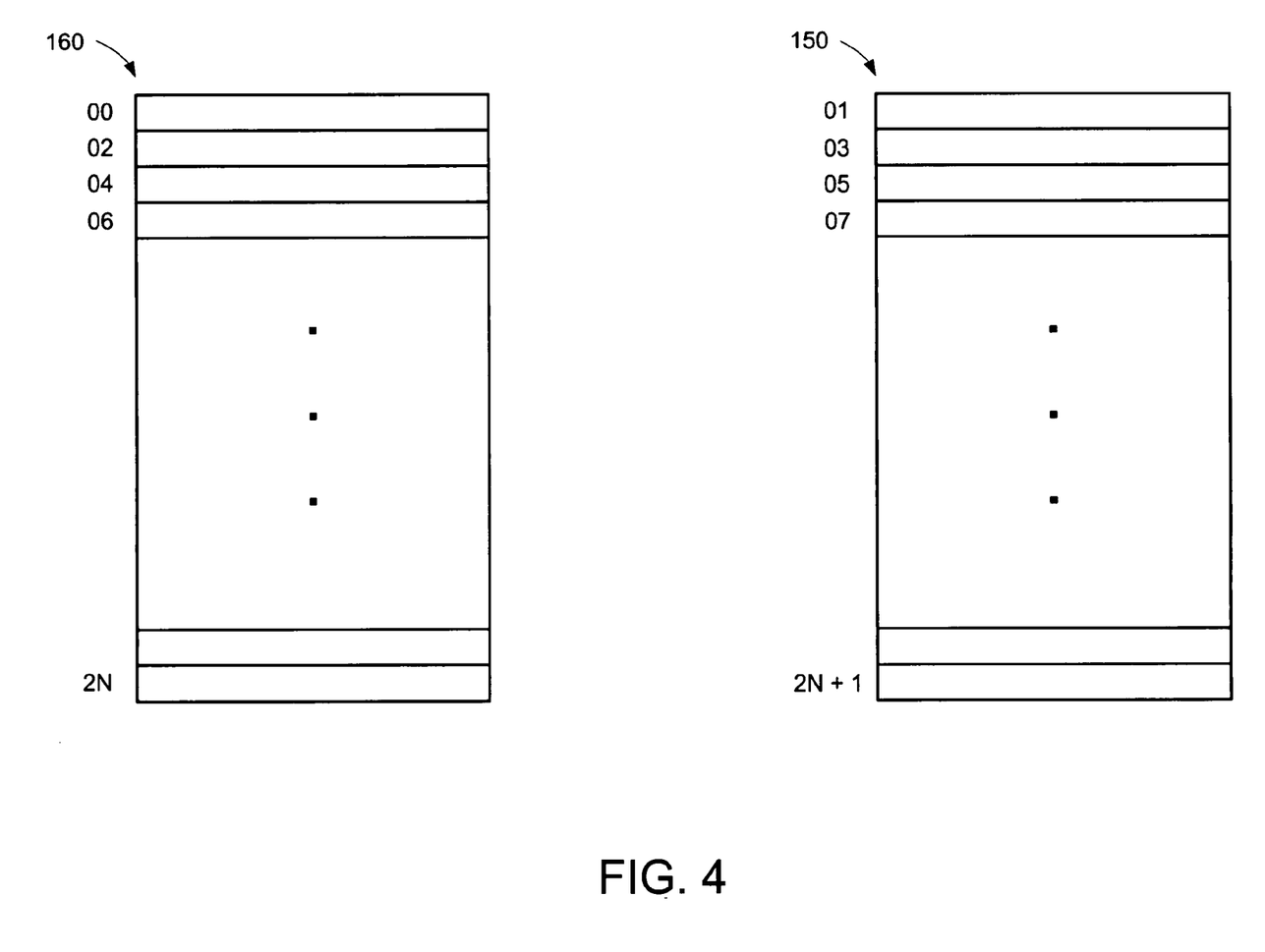
FIG. 4 is a block diagram illustrating the external memories of FIG. 1 according to an exemplary implementation of the present invention.

FIG. 4 illustrates memories 150 and 160 according to an exemplary embodiment of the present invention. Memory 150 may store odd-addressed words and memory 160 may store even-addressed words. That is, memory 150 may be configured with only odd addressed words, e.g., addresses 01, 03, 05, . . . 2N+1, where N is an integer, and memory 160 may be configured with only even addressed words, e.g., addresses 00, 02, 04, . . . 2N. According to the exemplary embodiment, the width of the data words in memories 150 and 160 is 8 bytes. In alternative implementations, other data widths may be employed. Switching logic 240, therefore, generates odd address information when writing data to memory 150 and even address information when writing the data frame information to memory 160. It should also be understood that the switching logic 240 transfers the data to the external memories 150 and 160 in a single clock cycle.

According to an exemplary embodiment, switching logic 240 continues to simultaneously write the data frame information to memories 150 and 160 in an alternating fashion (step 360). That is, the switching logic 240 writes data frame information received via one of the multiplexers to an odd addressed word in memory 150 while simultaneously writing data received from the other multiplexer to an even addressed word in memory 160. In this manner, 16-bytes of data are simultaneously written to external memories 150 and 160 in a single clock cycle and stored as two eight byte words. Alternating the bus privilege in this manner enables both external memory buses 170 and 180 to remain busy and maximizes the data throughput of network switch 110.

Figure 5:
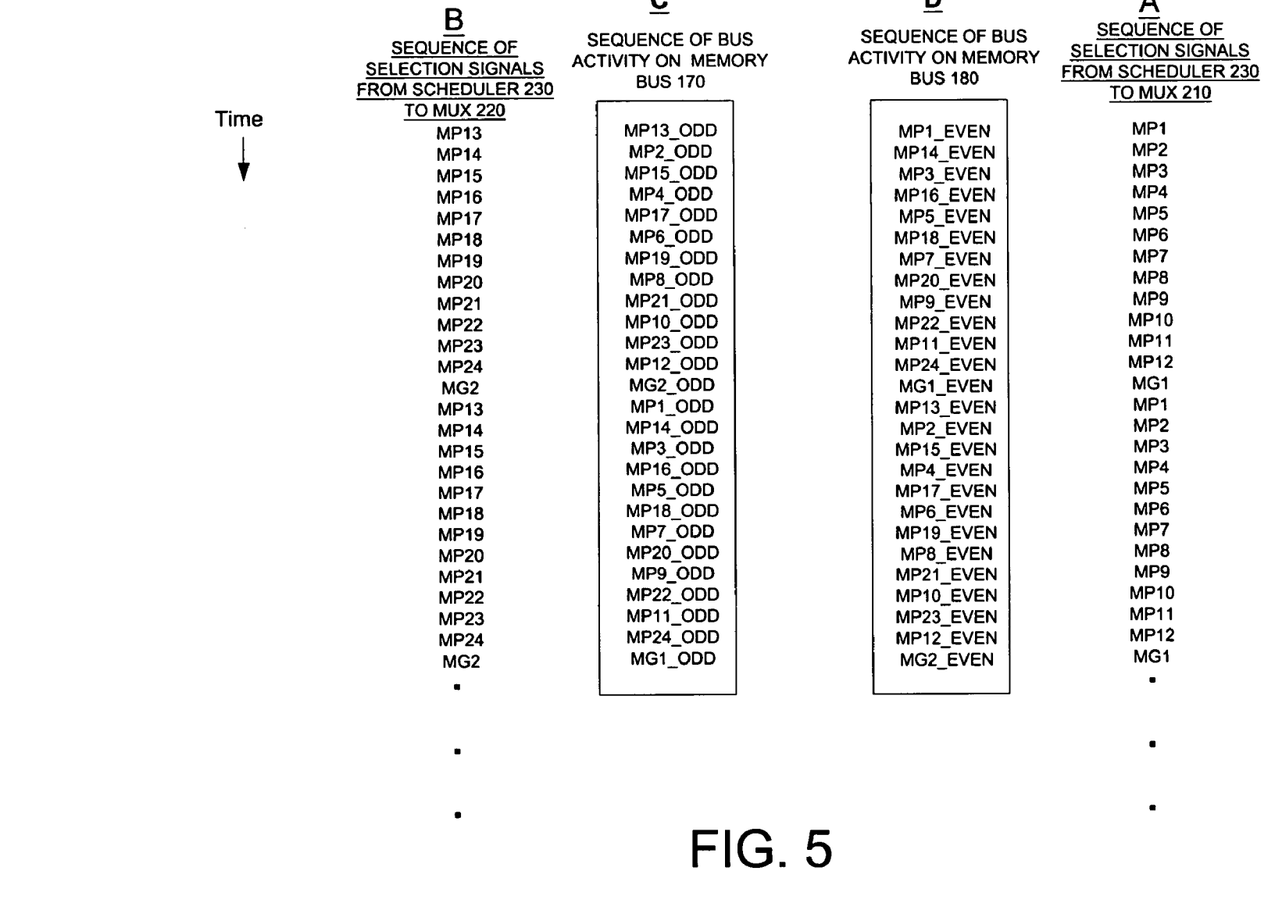
FIG. 5 is a block diagram illustrating an exemplary sequence of selection signals from the scheduler and the bus activity on the external memory buses of FIG. 2.

FIG. 5 illustrates the sequence of bus activity on memory bus 170 (i.e., the odd-address memory bus) and memory bus 180 (i.e., the even-address memory bus) according to an exemplary embodiment of the present invention. The sequence of selection or enable signals from scheduler 230 to multiplexers 210 and 220 is illustrated in columns A and B, respectively. As shown in column A, scheduler 230 outputs selection signals corresponding to the MAC ports in MAC unit 120, i.e., MP1 through MP12, and the 1 Gb/s MAC port, i.e., MG1, and repeats the cycle. As discussed previously, the 1 Gb/s ports may include 10 times as many slots as the 100 Mb/s ports and, therefore, the selection signals corresponding to the Gb/s ports may represent 10 slots. Alternatively, the sequence of selection signals may be modified to provide the gigabit port with an adequate number of slots in which to make its transfers. Scheduler 230 also outputs selection signals corresponding to the MAC ports in MAC unit 130, i.e., MP13 through MP24 and the 1 Gb/s port, i.e., MG2, in a similar manner.

Columns C and D in FIG. 5 represent the sequence of bus activity on memory buses 170 and 180, respectively, based on the sequence of enable signals in columns A and B. As described previously, the switching logic 240 simultaneously writes data frame information from multiplexers 210 and 220 to memories 150 and 160. For example, at the first time slot illustrated in FIG. 5, the switching logic 240 transfers 8 bytes of data frame information from MAC port 1 (MP1) to an even addressed word (MP1_EVEN) in memory 160 via memory bus 180, as illustrated by the first entry in column D. Also during the first time slot, the switching logic 240 transfers 8 bytes of data frame information from MAC port 13 (MP13) to an odd addressed word (MP13_ODD) in memory 150 via memory bus 170, as illustrated by the first entry in column C. The switching logic 240 may then alternate the storage of data frame information received from multiplexers 210 and 220. That is, the switching logic 240 may transfer the next 8 bytes of data frame information received from multiplexer 210 to memory 150, as indicated by the second entry MP2_ODD in column C. The switching logic 240 may also transfer the next 8 bytes of data frame information received from multiplexer 220 to memory 160, as indicated by the second entry MP14_EVEN in column D.

The switching logic 240 continues this process of alternating the storage of data frame information from multiplexers 210 and 220 to memories 150 and 160. In this manner, the external memory interface 140 outputs 16 bytes at a time for storage in external memories 150 and 160. The external memory interface 140 may then retrieve the data frame information stored in memories 150 and 160 in a similar manner. That is, the external memory interface 140 may retrieve 16 bytes of data frame information during a single clock cycle via buses 170 and 180.

Described has been an apparatus and method for accessing external memories from a network switch. One advantage of the invention is that the width of the external memory buses 170 and 180 and the data width of the words in the external memories 150 and 160 is reduced to 8 bytes. This results in less wasted bandwidth when performing partial word transfers or when performing memory management involving buffer headers and enables the network switch 110 to meet the overall data throughput required in typical high speed networks.

For example, in typical systems, the external memory bandwidth needs to be large enough to accommodate the maximum transient network traffic. For a "24+2" switch (i.e., twenty-four 100 Mb/s ports and two 1 Gb/s ports), for example, the maximum incoming and outgoing bit rate on the network switch is $((24 \times 100)$ Mb/s$+(2 \times 1000)$ Mb/s$)) \times 2$, or 8.8 Gb/s. That means that the bus width times the bus frequency must be greater than 8.8 Gb/s. The present invention has been found to advantageously achieve data throughput in excess of the required 8.8 Gb/s rate when using a 100 MHz external bus frequency. Therefore, the present invention advantageously supports high data throughput requirements and increases bus efficiency.

Only the preferred embodiments of the invention and a few examples of its versatility are shown and described in the present disclosure. It is to be understood that the invention is capable of use in various other combinations and environments and is capable of modifications within the scope of the inventive concept as expressed herein.

For example, the present invention has been described with the example of a multiport network switch storing and retrieving data frame information to and from external memories. The present invention is also applicable to other situations involving access to external memories where bus efficiency is of importance.

What is claimed is:

1. A network device configured to control communication of data frames between stations, comprising:
   a plurality of receive devices corresponding to ports on the network device, the receive devices configured to receive data frames from the stations; and
   an external memory interface configured to:
     receive data from the plurality of receive devices,
     transfer a portion of the data received from a first group of the receive devices to a first memory and a second memory in an alternating manner, and
     transfer a portion of the data received from a second group of the receive devices to the first memory and the second memory in an alternating manner,
     generate odd address information when transferring data via a first external memory bus to the first memory, and generate even address information when transferring data via a second external memory bus to the second memory.

2. The network device of claim 1, wherein the external memory interface includes:
a scheduler coupled to the receive devices and configured to enable the received data frames to be output to the first and second memories, the scheduler simultaneously outputting first and second selection signals for outputting data from one of the first group of receive devices and one of the second group of receive devices, respectively.

3. The network device of claim 2, wherein the external memory interface is further configured to simultaneously transfer 8 bytes of data from one of the first group of receive devices to the first memory and 8 bytes of data from one of the second group of receive devices to the second memory.

4. The network device of claim 1, wherein the external memory interface is further configured to simultaneously transfer the portions of the data from the first and second groups of receive devices to the first and second memories.

5. The network device of claim 1, wherein the external memory interface is configured to simultaneously transfer data received from a first one of the first group of the receive devices via the first external memory bus and a second one of the second group of the receive devices via the second external memory bus.

6. The network device of claim 5, wherein the first and second external memory buses are each 8-bytes wide and operate at a frequency of 100 MHz.

7. The network device of claim 1, wherein the external memory interface is further configured to simultaneously retrieve data from the first and second memories.

8. The network device of claim 1, wherein the external memory interface is further configured to:
transfer data from one of the first group of receive devices to the first memory during a first clock cycle,
transfer data from one of the second group of receive devices to the second memory during the first clock,
transfer data from one of the first group of receive devices to the second memory during a second clock cycle, the second clock cycle immediately succeeding the first clock cycle, and
transfer data from one of the second group of receive devices to the first memory during the second clock cycle.

9. In a network device that controls communication of data frames between stations, a method of storing data frame information, comprising:
receiving a plurality of data frames;
temporarily storing the received data frames in a plurality of receive devices; and
simultaneously transferring data frame information to at least a first memory and a second memory, wherein the simultaneously transferring includes:
alternating the transferring of data frame information from a first group of the receive devices to the first and second memories, and
alternating the transferring of data frame information from a second group of the receive devices to the first and second memories, wherein when data frame information from the second group of receive devices is being transferred to one of the first and second memories, data frame information from the first group of receive devices is being transferred to the other of the first and second memories.

10. The method of claim 9, further comprising:
simultaneously transmitting selection signals to first and second receive devices for selectively outputting data stored in the first and second receive devices.

11. The method of claim 9, wherein the simultaneously transferring further includes:
transferring 8 bytes of data from a first receive device to the first memory and 8 bytes of data from a second receive device to the second memory.

12. The method of claim 9, wherein the simultaneously transferring further includes:
sending a portion of a first data frame via a first external memory bus and sending a portion of a second data frame via a second external memory bus.

13. The method of claim 9, further comprising:
simultaneously retrieving data frame information from the first and second memories.

14. The method of claim 9, wherein the alternating of the transferring of data frame information from the first group of receive devices to the first and second memories is performed each clock cycle.

15. A data communication system for controlling the communication of data frames between stations, comprising:
a plurality of receive devices configured to receive data frames from the stations;
a scheduler coupled to the plurality of receive devices and configured to generate selection signals to selectively output data frame information from the receive devices;
a switching device configured to:
receive the data frame information, and
simultaneously transfer data frame information from one of a first group of receive devices via a first external memory bus and data frame information from one of a second group of receive devices via a second external memory bus;
a first memory configured to receive data frame information from the first external memory bus; and
a second memory configured to receive data frame information from the second external memory bus, wherein the switching device is further configured to:
generate data address information having odd addresses for data transferred to the first memory,
generate data address information having even addresses for data transferred to the second memory,
transfer data frame information from the first group of receive devices to the first and second external memory buses in an alternating manner, and
transfer data frame information from the second group of receive devices to the first and second external memory buses in an alternating manner.

16. The system of claim 15, further comprising:
first and second multiplexers coupled to the first and second groups of the receive devices, respectively, each of the first and second multiplexers being configured to receive the selection signals from the scheduler and to output a portion of a data frame.

17. The system of claim 16, wherein the switching device is further configured to transfer data received from the first multiplexer to the first and second external memory buses in an alternating manner and to transfer data received from the second multiplexer to the first and second external memory buses in an alternating manner.

18. The system of claim 15, wherein the first memory is configured to store data words having odd addresses and the second memory is configured to store data words having even addresses.

19. The system of claim 15, wherein the switching device is further configured to:
alternate the transfer of data frame information from the first group of receive devices to the first and second external memory buses each clock cycle, and
alternate the transfer of data frame information from the second group of receive devices to the first and second external memory buses each clock cycle.

* * * * *